(12) United States Patent
Akutsu et al.

(10) Patent No.: US 6,707,185 B2
(45) Date of Patent: Mar. 16, 2004

(54) ELECTRIC POWER STEERING APPARATUS

(75) Inventors: Satoru Akutsu, Tokyo (JP); Masafumi Okazaki, Tokyo (JP); Hideki Megata, Tokyo (JP); Shinsuke Hemmi, Tokyo (JP); Masayoshi Nishikawa, Tokyo (JP); Tetsunao Takaki, Tokyo (JP); Toshinori Tanaka, Tokyo (JP); Takeshi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/189,446

(22) Filed: Jul. 8, 2002

(65) Prior Publication Data

US 2003/0127921 A1 Jul. 10, 2003

(30) Foreign Application Priority Data

Jan. 8, 2002 (JP) ........................................ 2002-001265

(51) Int. Cl.[7] ................................................. H02K 7/00
(52) U.S. Cl. .......................... 310/71; 310/89; 310/68 B
(58) Field of Search ............................... 310/89, 71, 64, 310/68 B

(56) References Cited

U.S. PATENT DOCUMENTS

| | | | |
|---|---|---|---|
| 5,491,370 A | * | 2/1996 | Schneider et al. ............. 310/54 |
| 5,770,902 A | * | 6/1998 | Batten et al. .................. 310/71 |
| 5,814,909 A | * | 9/1998 | Yamada et al. ................ 310/64 |
| 6,081,056 A | * | 6/2000 | Takagi et al. .................. 310/89 |
| 6,107,716 A | * | 8/2000 | Penketh ........................ 310/89 |
| 6,144,137 A | * | 11/2000 | Engelbert .................... 310/258 |
| 6,198,183 B1 | * | 3/2001 | Baeumel et al. ............... 310/52 |
| 6,236,126 B1 | * | 5/2001 | Yagi et al. ..................... 310/51 |
| 6,268,669 B1 | * | 7/2001 | Wakao et al. ............. 310/67 R |
| 6,577,030 B2 | * | 6/2003 | Tominaga et al. ......... 310/68 B |

FOREIGN PATENT DOCUMENTS

| | | |
|---|---|---|
| JP | 8-258730 | 10/1996 |
| JP | 11-115775 | 4/1999 |

* cited by examiner

Primary Examiner—Dang Le
(74) Attorney, Agent, or Firm—Sughrue Mion, PLLC

(57) ABSTRACT

An electric power steering apparatus in which a housing (3) is formed with a housing opening (38) through which bus bars (20) pass for electrically connecting the motor (1) and the control circuit unit (2) with each other. A casing is formed with a heat sink opening (46) through which the bus bars (20) pass, so that the motor (1) and the control circuit unit (2) are integrated with each other with the housing opening (38) and the heat sink opening (46) disposed to correspond to each other.

17 Claims, 17 Drawing Sheets

ELECTRIC POWER STEERING APPARATUS

This application is based on Application No. 2002-1265, filed in Japan on Jan. 8, 2002, the contents of which are hereby incorporated by reference.

BACKGROUND OF THE INVENTION

1. Field of the Invention

The present invention relates to an electric power steering apparatus for assisting the steering force of a steering wheel of a vehicle.

2. Description of the Prior Art

FIG. 18 is a cross sectional view of a conventional electric power steering apparatus as disclosed in Japanese Patent Application Laid-Open No. 8-258730.

In this electric power steering apparatus, a motor 100 and a control circuit unit 103 for controlling a current flowing through the motor 100 are housed in a bottomed cylindrical casing 101.

The motor 100 includes a shaft 104 connected with a steering mechanism of a vehicle, a rotor 108 fixedly secured to the shaft 104, a magnet 107 arranged to surround the rotor 108, an electromagnetic clutch 105 for controlling torque transmitted to the steering mechanism in an on and off manner, and an angle sensor 106 for detecting the steering angle of a steering wheel or the rotational angle or position of the shaft 104 to generate a corresponding output to the control circuit unit 103.

In the electric power steering apparatus as constructed above, the shaft 104 is driven to rotate by means of the motor 100, so that the rotational force of the motor 104 is transmitted to the steering mechanism through the shaft 104 so as to provide torque assistance of the steering mechanism.

With the above-mentioned conventional electric power steering apparatus in which the motor 100 and the control circuit unit 103 are housed in the casing 101, there are the following problems.

(1) The motor 100 and the control circuit unit 103 can not be easily separated from each other, and hence when either one of the motor 100 and the control circuit unit 103 fails, it is necessary to replace the electric power steering apparatus on the whole.

(2) Assemblability is poor since it is necessary to assemble the motor 100 and the control circuit unit 103, which are mutually connected with each other through wiring or lead wires, into the bottomed cylindrical casing 101 at the same time.

SUMMARY OF THE INVENTION

The present invention is intended to solve the problems as referred to above, and has for its object to provide an electric power steering apparatus in which upon failure of either one of a motor and a control circuit unit, the failed one alone has to be replaced with a new one, and which is improved in assemblability.

Bearing the above object in mind, an electric power steering apparatus according to the present invention includes: a motor having a housing and a shaft disposed on an axis of the housing and connected with a steering mechanism of a vehicle, the motor being operable to assist a steering force of a steering wheel through the shaft; and a control circuit unit with a power device for driving the motor being disposed in a casing. The housing is formed with a housing opening through which lead wires pass. The casing is also formed with a casing opening through which the lead wires pass. The motor and the control circuit unit are integrated with each other with the housing opening and the casing opening disposed to correspond to each other. With the above arrangement, when either one of the motor and the control circuit unit fails, it is only necessary to replace the failed one alone, thus making it possible to reduce the cost of replacement. In addition, it only has to first assemble the motor and the control circuit unit separately from each other and then integrate the motor and the control circuit unit into a single unit in the final process, thus improving the assemblability thereof.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings. In the following description and accompanying drawings, the same or corresponding members or parts are identified by the same symbols.

Embodiment 1

First, an electric power steering apparatus according to a first embodiment of the present invention will be described below.

Figure 1:
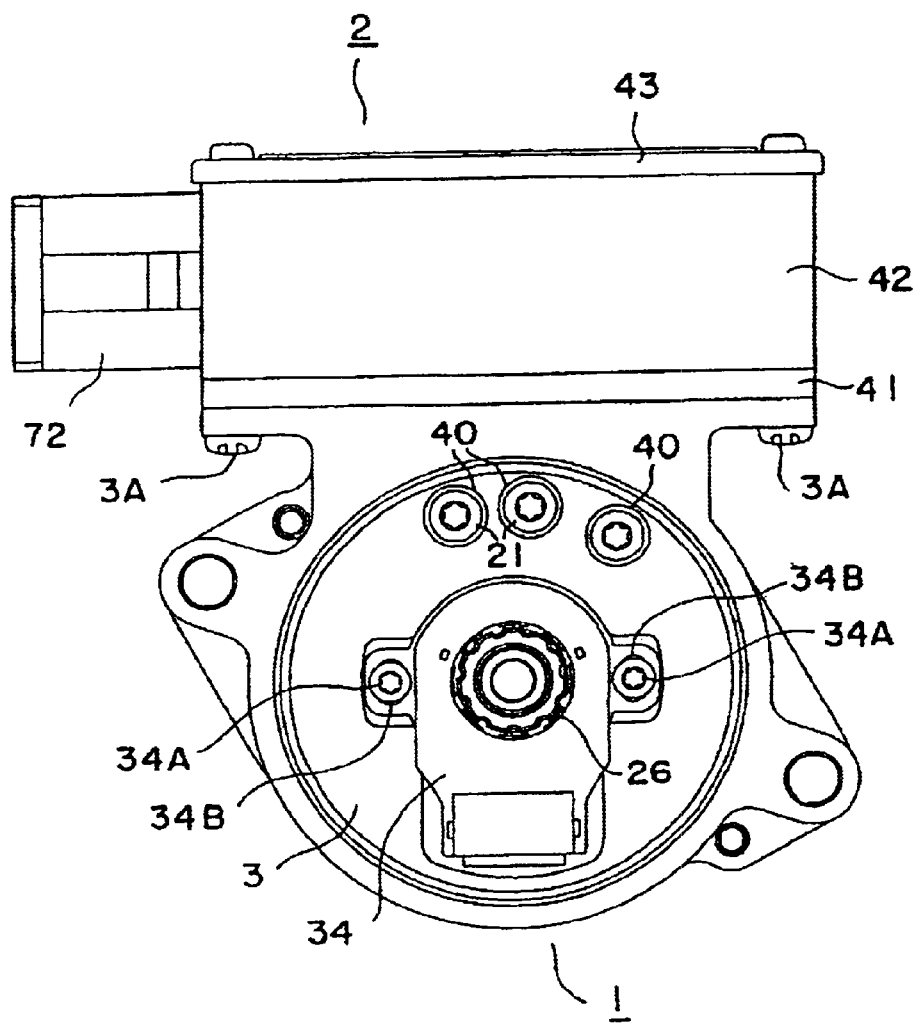
FIG. 1 is a front elevational view of an electric power steering apparatus according to a first embodiment of the present invention.
Figure 2:
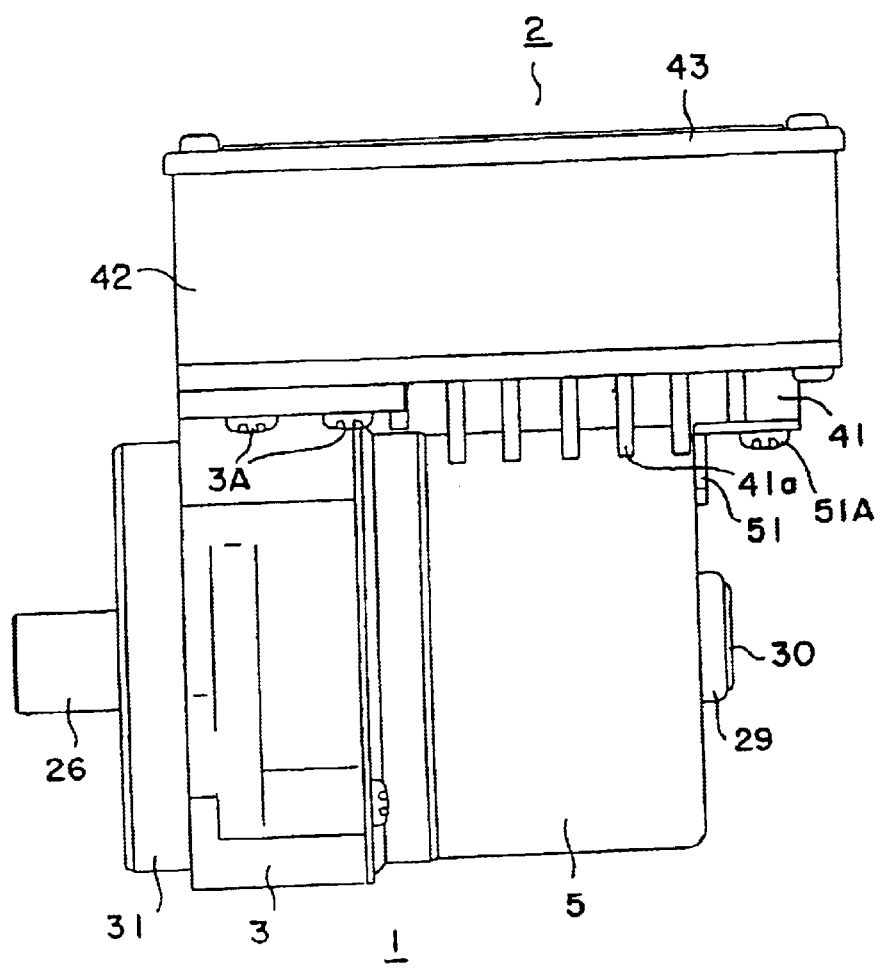
FIG. 2 is a right-hand side view of the electric power steering apparatus of FIG. 1.
Figure 3:
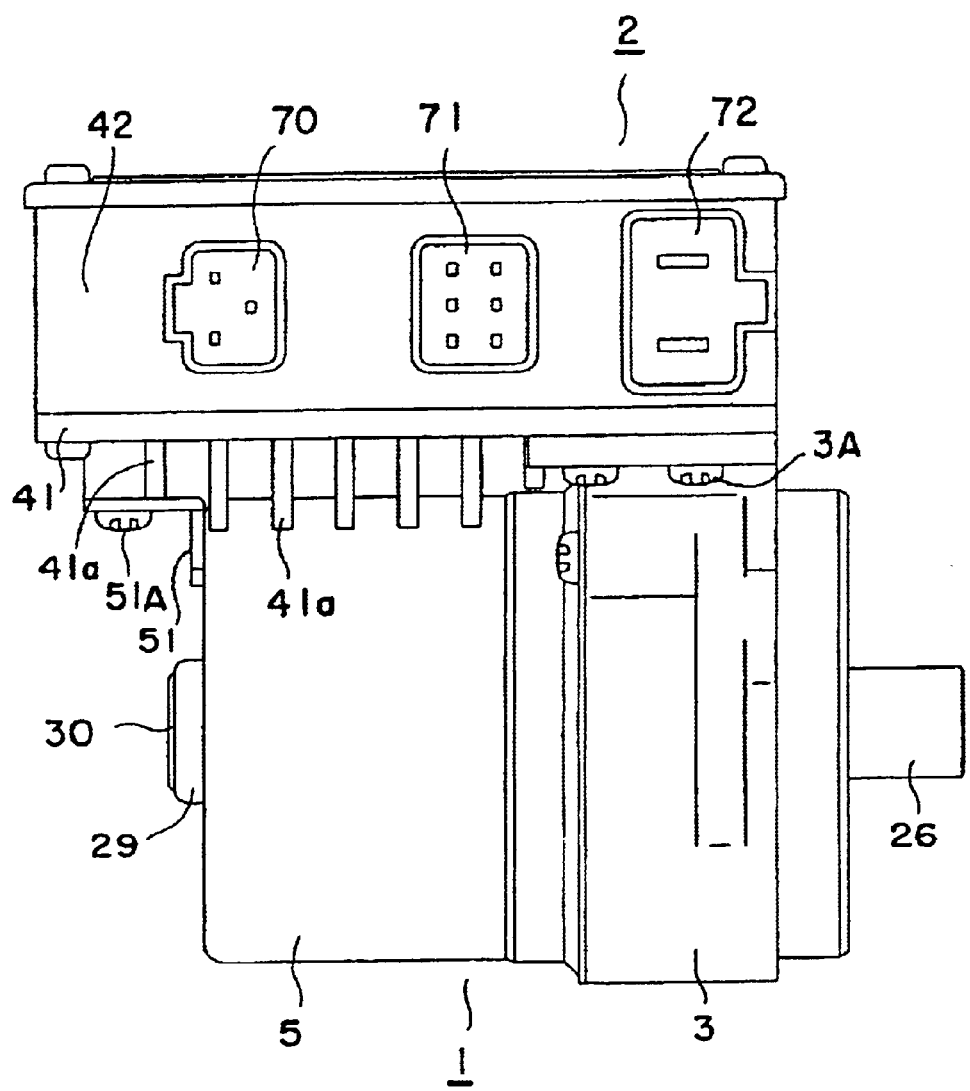
FIG. 3 is a left-hand side view of the electric power steering apparatus of FIG. 1.
Figure 4:
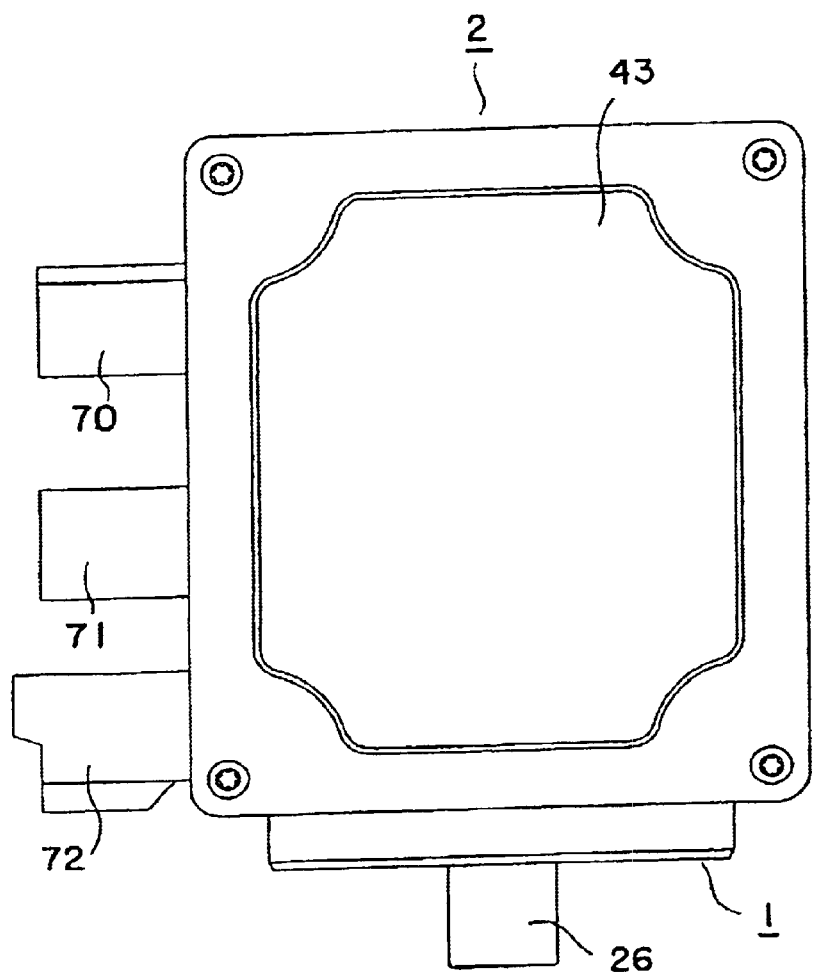
FIG. 4 is a plan view of the electric power steering apparatus of FIG. 1.
Figure 5:
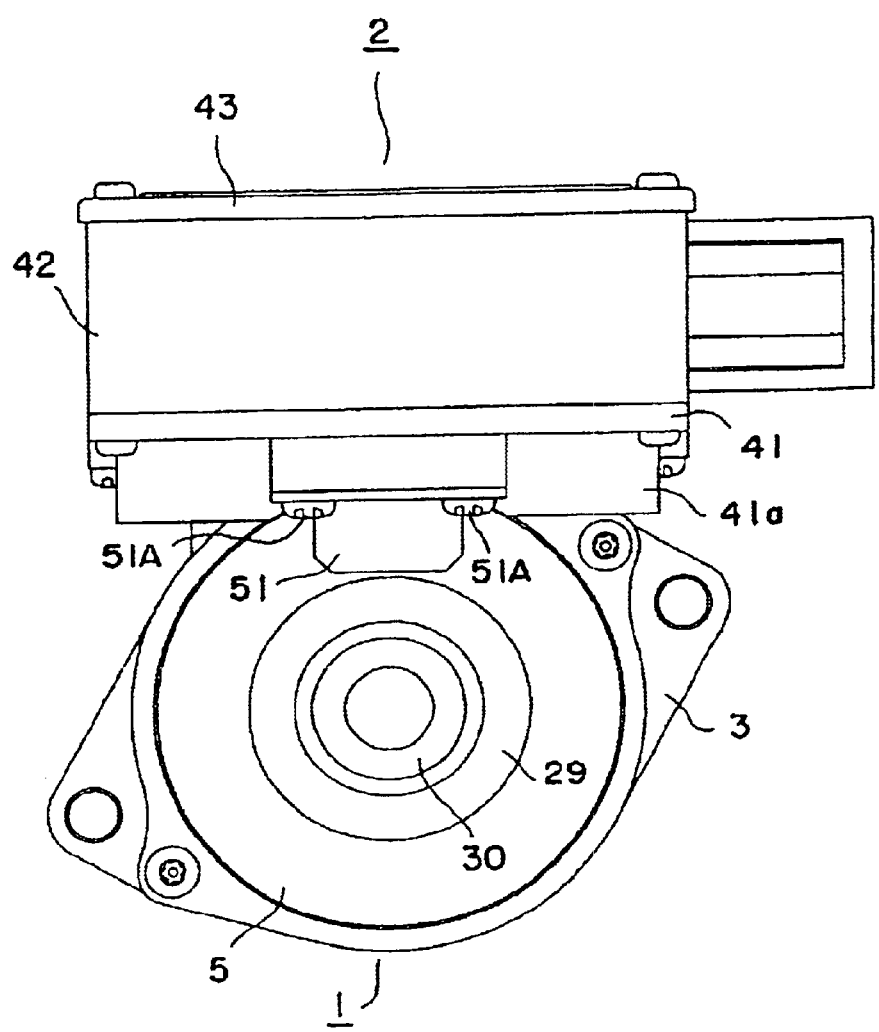
FIG. 5 is a rear view of the electric power steering apparatus of FIG. 1.

FIG. 1 is a front elevation of the electric power steering apparatus according to the first embodiment of the present invention. FIG. 2 is a right-hand side view of the electric power steering apparatus shown in FIG. 1. FIG. 3 is a left-hand side view of the electric power steering apparatus shown in FIG. 1. FIG. 4 is a plan view of the electric power steering apparatus shown in FIG. 1. FIG. 5 is a rear view of the electric power steering apparatus shown in FIG. 1.

Figure 6:
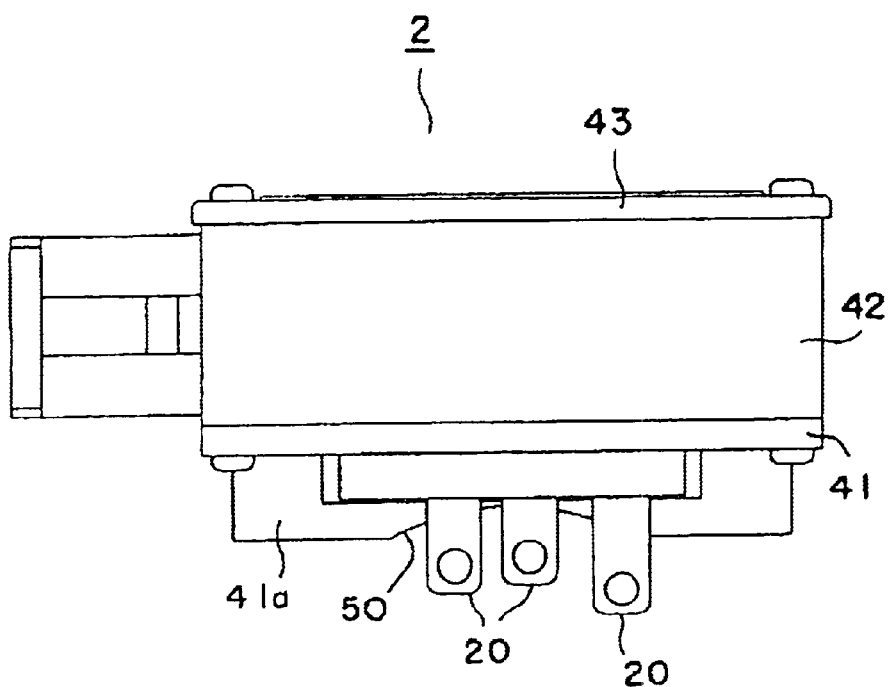
FIG. 6 is a view illustrating a control circuit unit of FIG. 1 with a motor removed.
Figure 7:
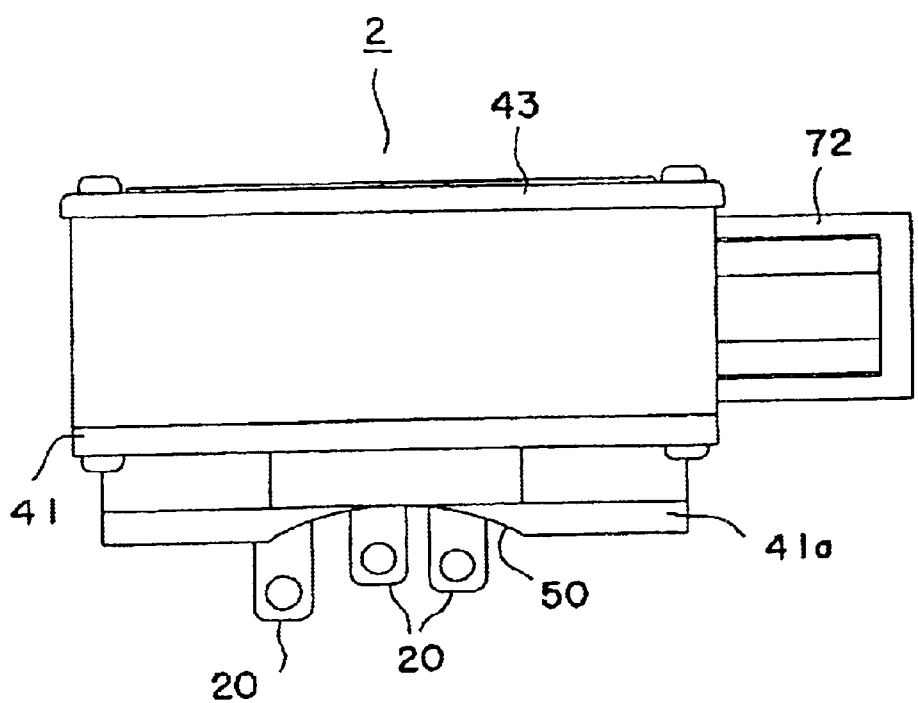
FIG. 7 is a rear view of the control circuit unit.
Figure 8:
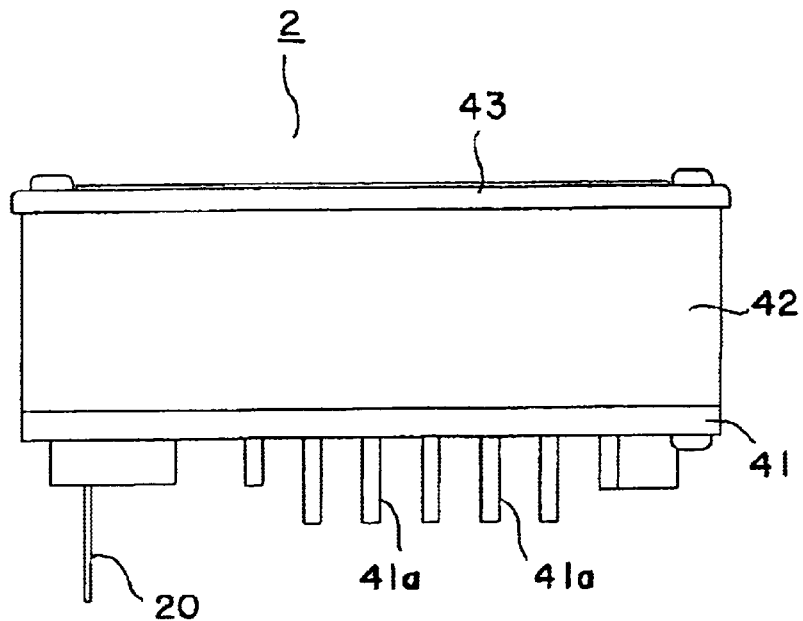
FIG. 8 is a view illustrating the control circuit unit of FIG. 2 with the motor removed.
Figure 9:
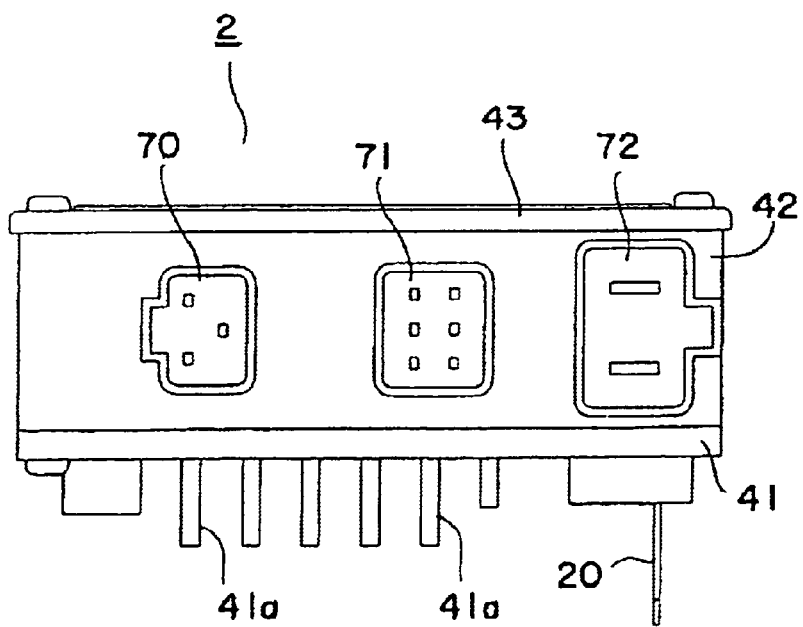
FIG. 9 is a rear view of the control circuit unit of FIG. 8.
Figure 10:
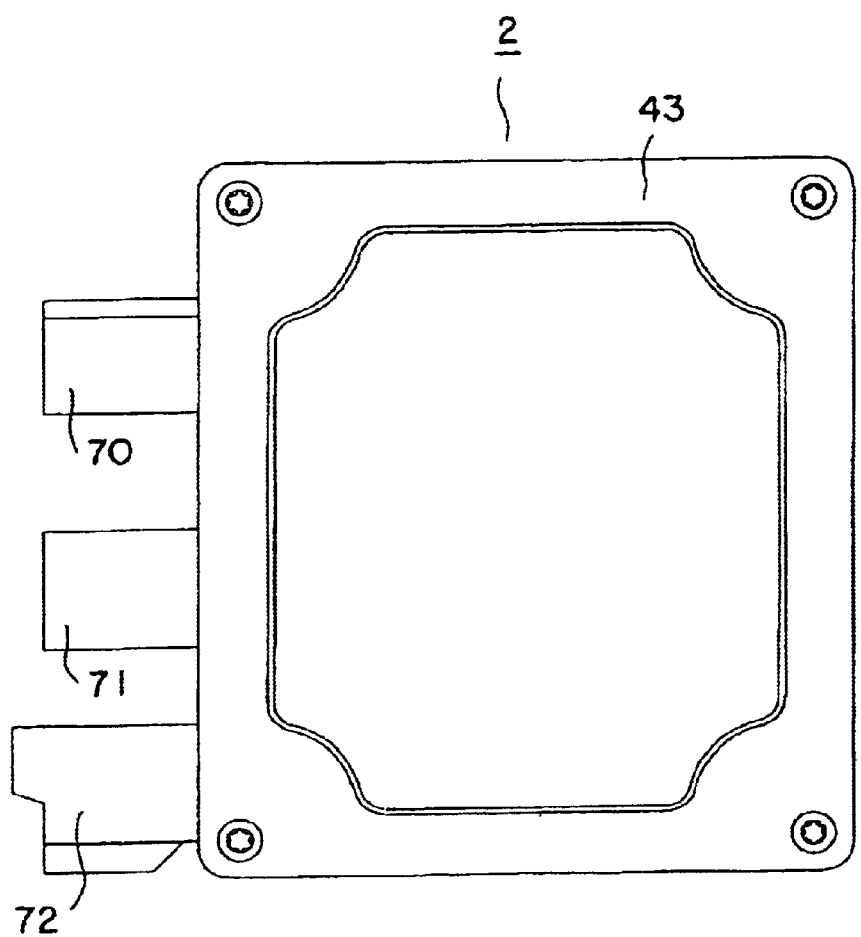
FIG. 10 is a plan view of the control circuit unit of FIG. 6.
Figure 11:
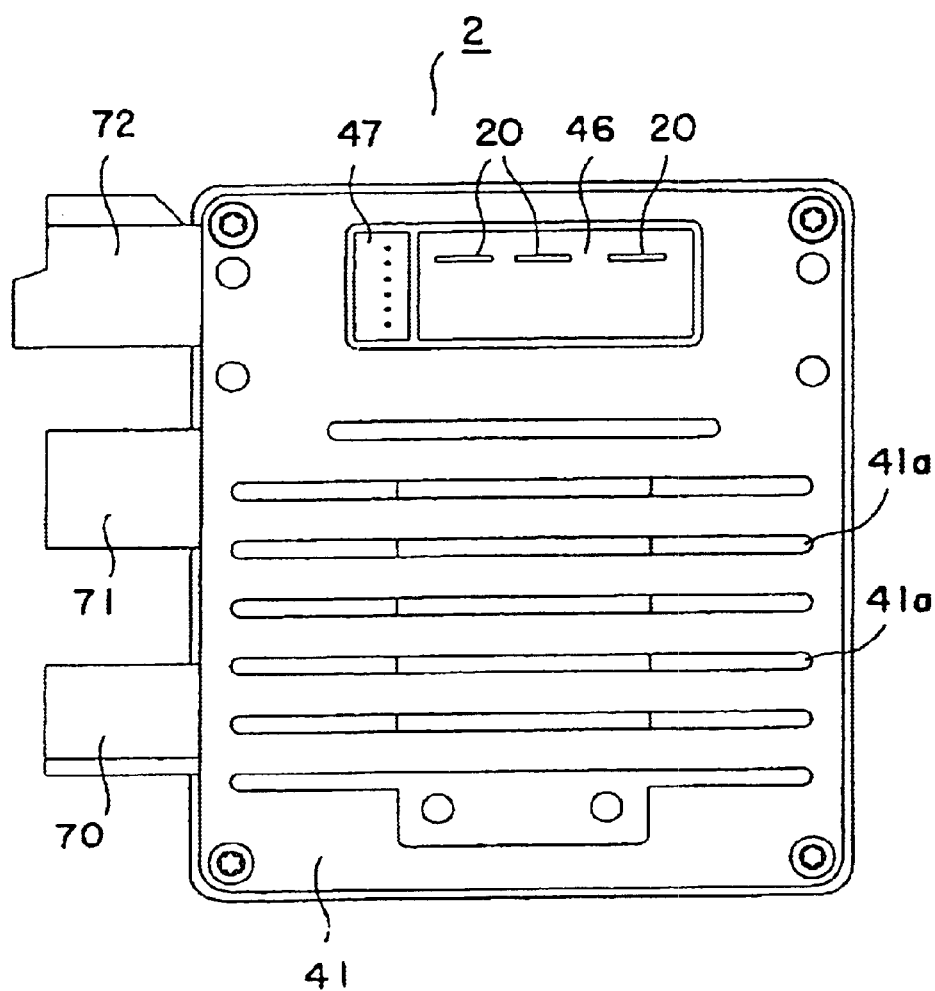
FIG. 11 is a bottom plan view of the control circuit unit of FIG. 6.
Figure 12:
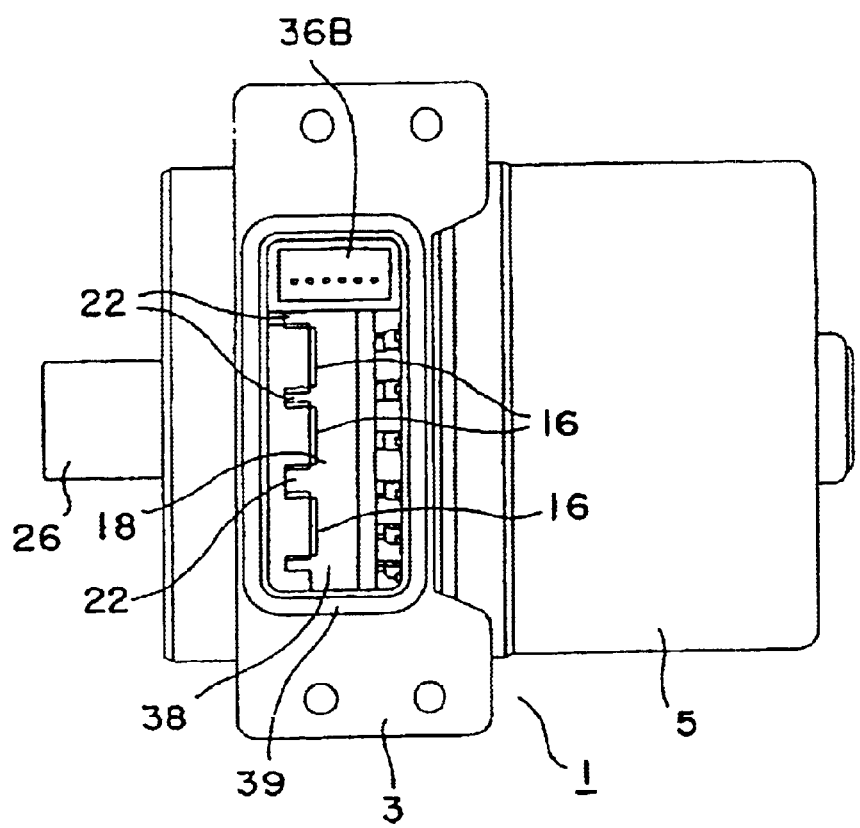
FIG. 12 is a plan view of the motor of FIG. 2 when the control circuit unit is removed.

FIG. 6 is a view of a control circuit unit 2 shown in FIG. 1 while excluding a motor 1. FIG. 7 is a rear view of the control circuit unit 2 shown in FIG. 6. FIG. 8 is a view of the control circuit unit 2 shown in FIG. 2 while excluding the motor 1. FIG. 9 is a rear view of the control circuit unit 2 shown in FIG. 8. FIG. 10 is a plan view of the control circuit unit 2 shown in FIG. 6. FIG. 11 is a bottom plan view of the control circuit unit 2 shown in FIG. 6. FIG. 12 is a plan view of the motor 1 of FIG. 2 when the control circuit unit 2 is removed.

Figure 13:
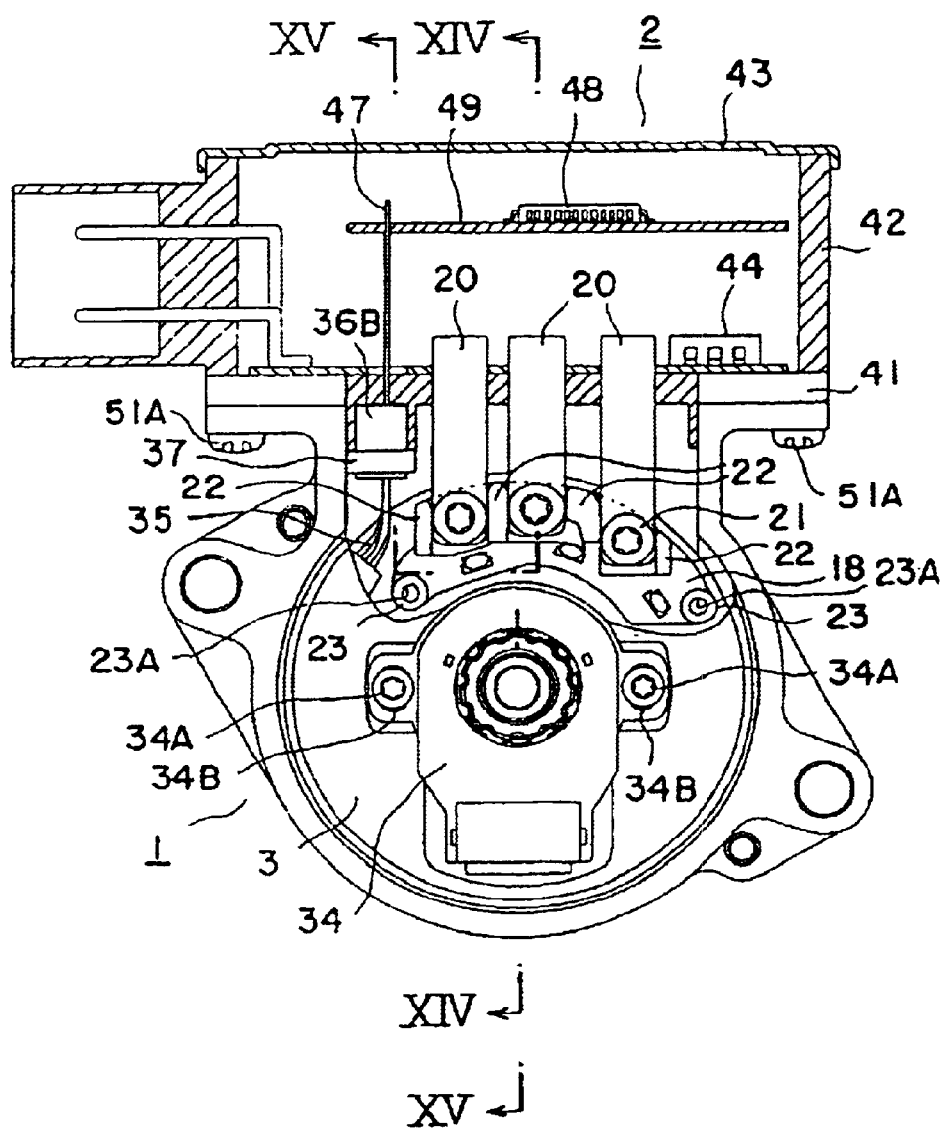
FIG. 13 is a partially cutaway cross sectional view of the electric power steering apparatus of FIG. 1.
Figure 14:
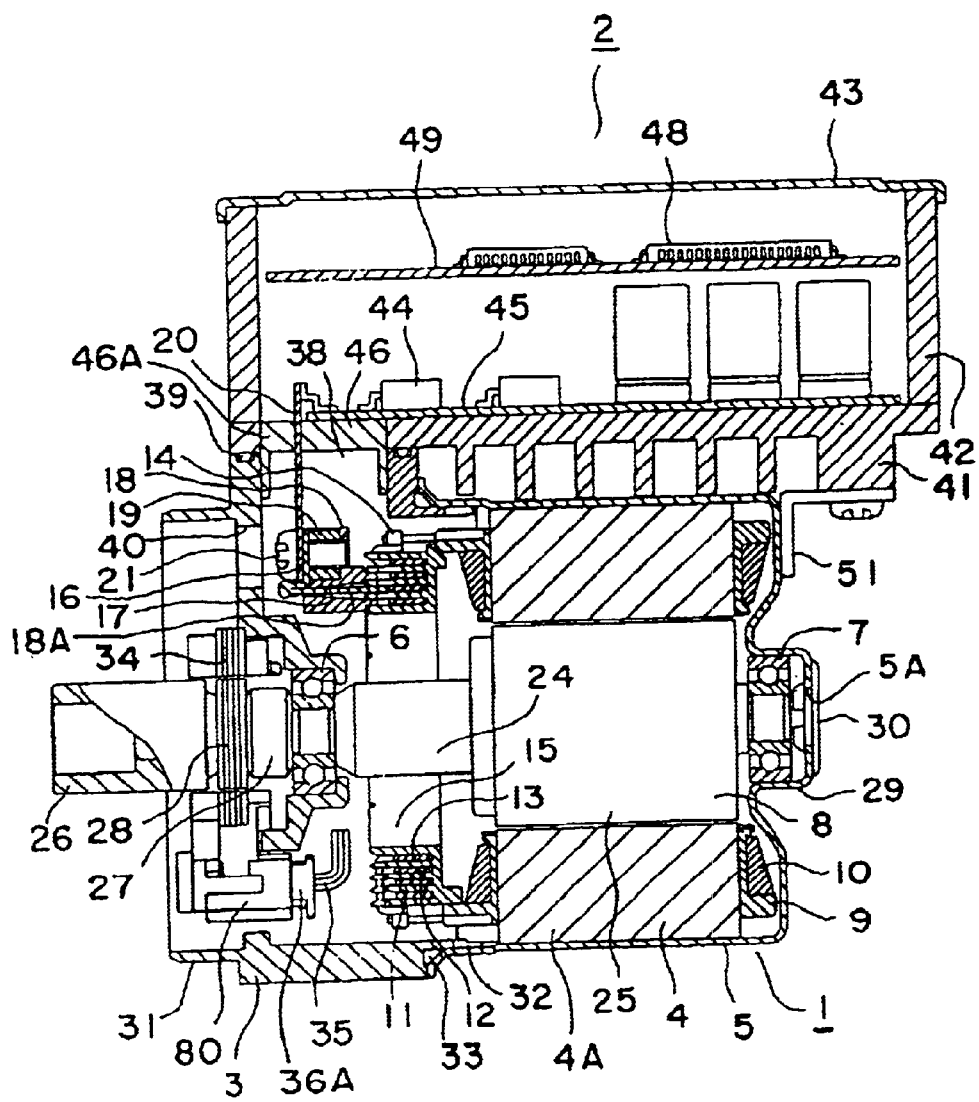
FIG. 14 is a cross sectional view along line XIV—XIV of FIG. 13.
Figure 15:
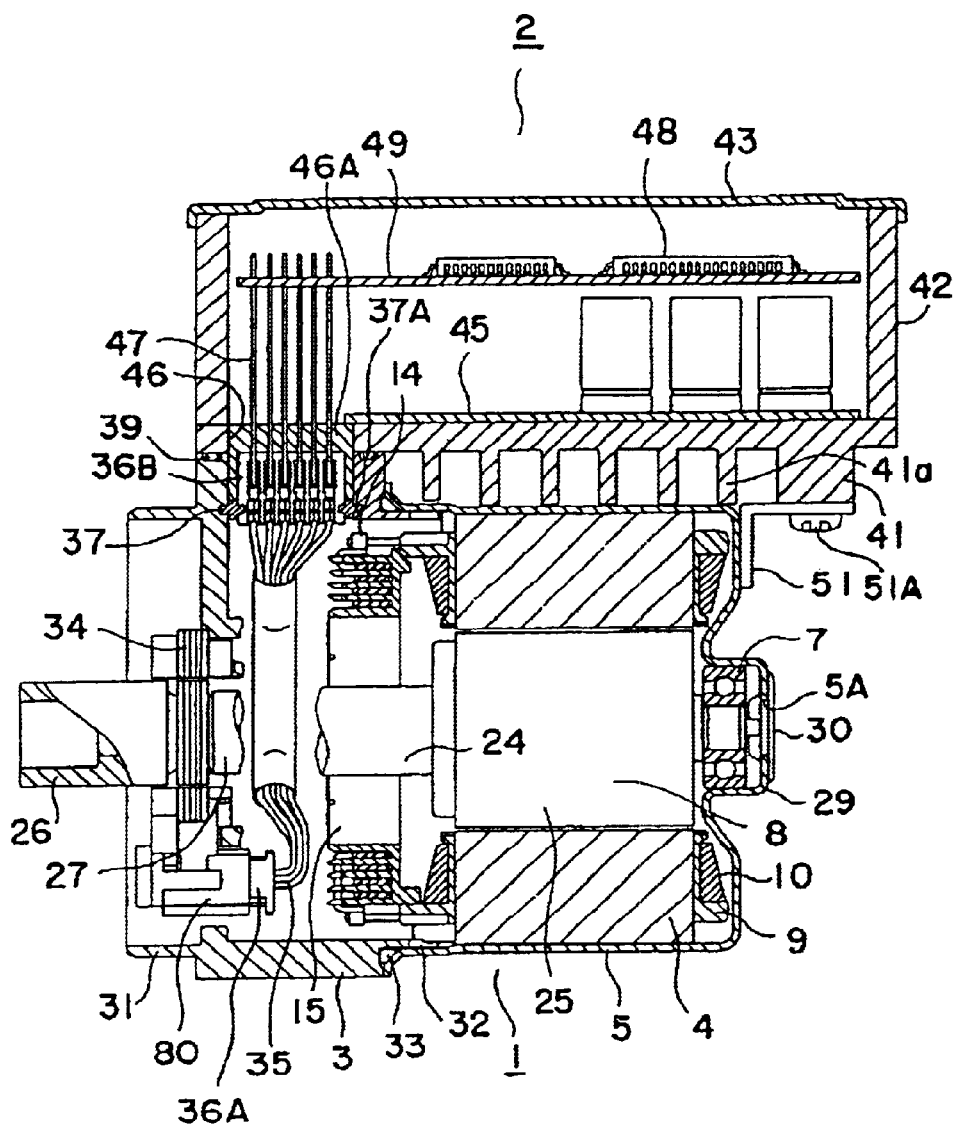
FIG. 15 is a cross sectional view along line XV—XV of FIG. 13.

FIG. 13 is a partially cutaway cross sectional view of the electric power steering apparatus shown in FIG. 1. FIG. 14 is a cross sectional view along line XIV—XIV of FIG. 13. FIG. 15 is a cross sectional view along line XV—XV of FIG. 13.

The electric power steering apparatus according to this embodiment is provided with the motor 1 and the control circuit unit 2.

The motor 1 includes a housing 3 made of aluminum or the like, a bottomed cylindrical frame 5 fittingly engaged on its peripheral portion with an engagement portion 32 of the housing 3, a stator 4 fixedly secured to an inner wall of the frame 5, a doughnut-shaped holder 15 fixedly secured to one side surface of the stator 4, a base 18 supported by an upper portion of the holder 15, a shaft 24 arranged on the central axis of the housing 3 and the stator 4 and rotatably supported by a front bearing 6 and a rear bearing 7, a rotor 8 having N-pole and S-pole magnets 25 arranged alternately and bonded to the shaft 24 with their outer peripheral surfaces covered with a protective tube (not shown), a boss 26 press-fitted into an end portion of the shaft 24 so as to be coupled with a steering mechanism (not shown), and a rotational position sensor in the form a resolver arranged between the boss 26 and a bush 27 for detecting the rotating angle of the rotor 8.

The stator 4 includes a core 4A formed of stacked silicon steel plates and having a plurality of axially extending slots (not shown) formed at circumferential intervals, and a motor coil 10 constructed of lead wires or conductors wound around the slots in the core 4A through a bobbin 9. The motor coil 10 has a U phase coil portion, a V phase coil portion, and a W phase coil portion star-connected with each other and also connected at their common sides to a common terminal 14 through fusing.

The holder 15 has a U phase terminal 11, a V phase terminal 12 and a W phase terminal 13 which are respectively formed on a resin-molded holder proper or holder main body so as to extend in a circumferential direction and received in corresponding grooves of different diametrical dimensions formed in the holder proper. The U phase terminal 11, the V phase terminal 12 and the W phase terminal 13 take a belt-shaped configuration when developed into a planar shape, but a circular configuration when received in the grooves. These terminals 11, 12 and 13 are connected with the U phase coil portion, the V phase coil portion and the W phase coil portion of the motor coil 10, respectively. Moreover, each of the U phase terminal 11, the V phase terminal 12 and the W phase terminal 13 has a connection portion 17 extending in the axial direction.

The base 18 is formed by insert molding bus bar side terminals 16, which are to be connected with corresponding bus bars 20 by screws 21, respectively, and nuts 19, into which the screws 21 are to be threaded, respectively, into an integral unit. The bus bar side terminals 16, which are in surface contact with the corresponding bus bars 20, are exposed to the outside. Bus bar guide portions 22 are provided on the opposite sides of each bus bar side terminal 16. In addition, the base 18 is formed with three tapered insertion slots 18A each expanding toward an opening portion.

Inserted into the insertion slots 18A, three in total, of the base 18 are the connection portions 17, respectively, which extend from the U phase terminal 11, the V phase terminal 12 and the W phase terminal 13 in the axial direction. The connection portions 17 are connected at their tip ends with the corresponding bus bar side terminals 16, respectively, through TIG welding. The bus bar side terminals 16 are arranged at right angles with respect to the shaft 24.

Here, note that the bus bar side terminals 16, the connection portions 17 and the respective phase terminals 11, 12 and 13 together constitute relay wires, which serve to electrically connect the bus bars 20 and the motor coil 10 with each other.

As shown in FIG. 13, the base 18 is formed at its opposite ends with bosses 23 each having a hole 23A in the center thereof. Engaged with the holes 23A, which act as engaging portions of the bosses 23, are bosses (not shown), which act as engaged portions, extending from the inner surface of the housing 3 in the axial direction, so that the base 18 is prevented from turning when the bus bars 20 are fixed to the base 18 by means of the screws 21.

The resolver is provided with an oval-shaped resolver rotor 28 press fitted into the shaft 24 and a resolver stator 34 enclosing the resolver rotor 28.

The front bearing 6 on the housing 3 side has an outer ring portion thereof fixedly secured to the housing 3 through caulking.

A stator 4 is press fitted into a cup-shaped frame 5, which is formed from an iron plate by drawing. The frame 5 is formed on its bottom with a bearing box 29 for receiving and holding the rear bearing 7.

The frame 5 is also formed on its bottom with a hole 5A used for placing the housing 3 and the frame 5 into fitting engagement with each other. A cap 30 made of rubber is mounted in the hole 5A for insuring the waterproofness in the interior of the motor 1.

The housing 3 is formed on its opposite ends with a gear side engagement portion 31 for fitting engagement with a steering gear side housing (not shown) and a frame side engagement portion 32 for fitting engagement with the frame 5, respectively.

The gear side engagement portion 31 of the housing 3 is waterproofed by an O ring (not show) mounted on the steering gear side gearbox so that water, dust and so on are prevented from entering the interior of the motor 1 from the gear side engagement portion 31.

A sealing member in the form of an O ring 33 is also mounted on the frame side engagement portion 32 of the housing 3, thus insuring the waterproofness thereof.

As shown in FIG. 1 and FIG. 13, the resolver stator 34 is fixedly secured to the housing 3 by means of screws 34A. The resolver stator 34 is formed at its opposite ends with elongated holes 34B, through which it is possible to make positional adjustments upon installation of the resolver stator 34 so as to accommodate assembly errors in the direction of rotation between the rotor 8 and the resolver rotor 28 and between the stator 4 and the housing 3.

A connector 80 for use with signal connection is provided on the resolver stator 34. Sensor lead wires 35 are provided at their opposite ends with a first sensor connector 36A and a second sensor connector 36B. The first sensor connector 36A is connected with the connector 80, and the second sensor connector 36B connected with the control circuit unit 2 is fixed to the housing opening 38 by means of an engagement member 37. The elastically deformable engagement member 37, which is made of a resin, takes the form of a ring-shaped configuration as a whole, and is formed at its opposite sides with projected portions 37A which extend in a diametrical or radial direction. An outer side part of each projected portion 37A is in fitting engagement with a concave portion formed in the inner wall of the housing opening 38, and an inner side part of each projected portions 37A is in fitting engagement with a concave portion formed in the second sensor connector 36B.

A sealing member in the form of an O ring 39 is provided on the outer peripheral portion of the housing opening 38 for insuring the waterproofness thereof. Moreover, a planar portion necessary for connection with the housing 3 is formed on that surface of the housing 3 around the housing opening 38 which is in contact with the control circuit unit 2. Here, note that the sealing member is not limited to the O ring 39 but may be another element such as, for instance, a non-metallic gasket.

The gear side engagement portion 31 of the housing 3 has threaded holes 40 formed in the inner side thereof at three locations for allowing an operator to turn the screws 21 from outside when the bus bars 20 are screwed to the base 18, so that the bus bars 20 can be fixedly attached to the bus bar side terminals 16 after the housing 3 and the frame 5 are assembled together.

A control circuit casing is constituted by a heat sink 41 having a fin portion 41a, a side wall portion 42 and a cover 43. The control circuit casing accommodates therein a metal substrate 45 having a power device 44 and so on mounted on one side surface thereof and a substrate 49 having a control microcomputer 48 and so on mounted thereon. A heat sink 41 is made into intimate contact with the other side surface of the metal substrate 45 on which the power device 44 is not mounted. The heat sink 41 is made of aluminum, which is light in weight and high in heat conductivity.

The heat sink 41 is formed with a heat sink opening 46 which has the same shape as that of the housing opening 38 and a central axis in alignment with that of the housing opening 38. Projected from the heat sink opening 46, which is a casing opening, are the three bus bars 20 for supplying drive current to the U phase, V phase and W phase coil portions of the motor coil 10. The bus bars 20 electrically connected with the power device 44 are fixedly secured to the heat sink 41 by means of a resin mold part 46A which closes the heat sink opening 46. The resin mold part 46A is formed by using a so-called potting means which serves to fill a gap with a resin.

The bus bars 20, which serve as lead wires, are mounted in such a manner that they are arranged at right angles with respect to the metal substrate 45 on which the power device 44 is mounted, with the thickness direction of the bus bars 20 being directed in parallel with the shaft 24 in a state where the control circuit unit 2 is assembled to the motor 1. In addition, the bus bars 20 are swingable by a prescribed quantity in the axial direction of the shaft 24 under the action of their own flexibility. Here, note that though this embodiment is of such a construction that the bus bars 20 are swingable, it may instead be constructed such that the bus bar side terminals 16 are swingable.

Sensor terminals 47 for connection with the resolver stator 34 are also projected from the heat sink opening 46 which acts as the casing opening. The sensor terminals 47 are fixed to the heat sink 41 by means of the resin mold part 46A. In addition, the sensor terminals 47 are connected at their one ends with the substrate 49, and inserted at their other ends into the second sensor connector 36B, whereby the resolver and the control circuit unit 2 are electrically connected with each other.

An arc-shaped notch portion 50 conforming to the outer peripheral configuration of the frame 5 of the motor 1 is formed on the fin portion 41a of the heat sink 41 so as to control or suppress the dimensions in the heightwise direction of the apparatus when the motor 1 and the control circuit unit 2 are assembled together.

The heat sink 41 are fixedly attached to the housing 3 by means of screws 3A in the neighborhood of the heat sink opening 46. Also, the heat sink 41 are fixed to the frame 5 by means of a stay 51 of an L-shaped cross section. The L-shaped stay 51 is fixed at a first or one side leg portion thereof to the heat sink 41 by a screw 51A, and at a second or other side leg portion to the bottom portion of the frame 5 through welding.

Thus, fixing locations, at which the motor 1 and the control circuit unit 2 are fixed to each other, are divided into a steering mechanism side portion, in which the casing opening in the form of the heat sink opening 46 is located, and another side portion opposite the steering mechanism side. As a result, the motor 1 and the control circuit unit 2 are strongly joined to each other to provide high vibration resistance and high shock resistance.

Although the bus bars 20 and the sensor terminals 47 project from the heat sink opening 46, the interior of the control circuit casing is sealingly closed by the resin mold part 46A plugged into the heat sink opening 46, so that it is possible to prevent dust, dirt and the like from entering the interior of the control circuit unit 2 when the control circuit unit 2 alone is stored or transported as a single or separate unit.

Incidentally, note that in the drawings, reference numeral 70 designates a communications connector for vehicle control, and reference numeral 71 designates a torque sensor connector.

In the electric power steering apparatus as constructed above, assembly of the component parts are carried out according to the following procedure.

First of all, the control circuit unit 2 is superposed on the motor 1 in such a manner that the housing opening 38 is placed into abutting engagement with the heat sink opening 46. In that case, one ends of the bus bars 20 of the control circuit unit 2 are faced with the base 18, and at the same time the sensor terminals 47 of the control circuit unit 2 are inserted into the second sensor connector 36B.

Thereafter, the heat sink 41 is fixedly attached to the housing 3 by means of the screws 3A. In addition, the heat sink 41 and the frame 5 are fixed to each other by the stay 51 of the L-shaped cross section.

Finally, the bus bars 20 are fixedly secured to the base 18 by using the screws 21 through the threaded holes 40 in the housing 3, and the motor coil 10 and the control circuit unit 2 are electrically connected with each other.

With the electric power steering apparatus of the above-mentioned construction, the shaft 24 is driven to rotate by the motor 1, so that the rotational driving force of the motor 1 is transmitted to the steering mechanism through the shaft 24 to assist the torque of the steering mechanism.

Embodiment 2

Figure 16:
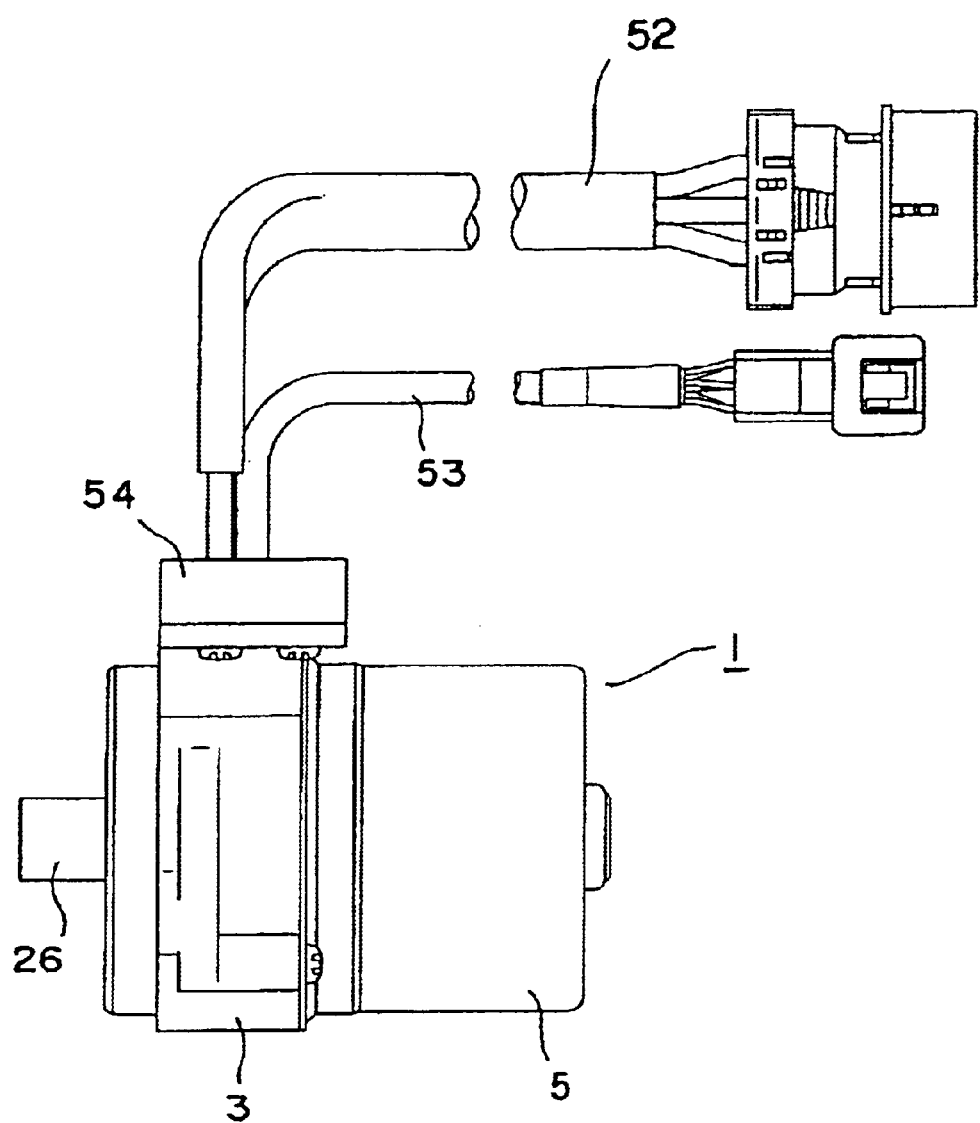
FIG. 16 is a front elevation of a motor in an electric power steering apparatus according to another embodiment of the present invention.

As shown in FIG. 16, respective lead wires 52 of the U phase, V phase and W phase may be used in place of the bus bars 20 which act as the lead wires, and sensor lead wires 53 may be used in place of the sensor terminals 47, and an attachment 54, from which these lead wires 52, 53 are derived or extended, may be mounted on the motor 1, thus making it possible to electrically connect the motor 1 with the control circuit unit without changing the above-mentioned structure of the motor 1.

Embodiment 3

Figure 17:
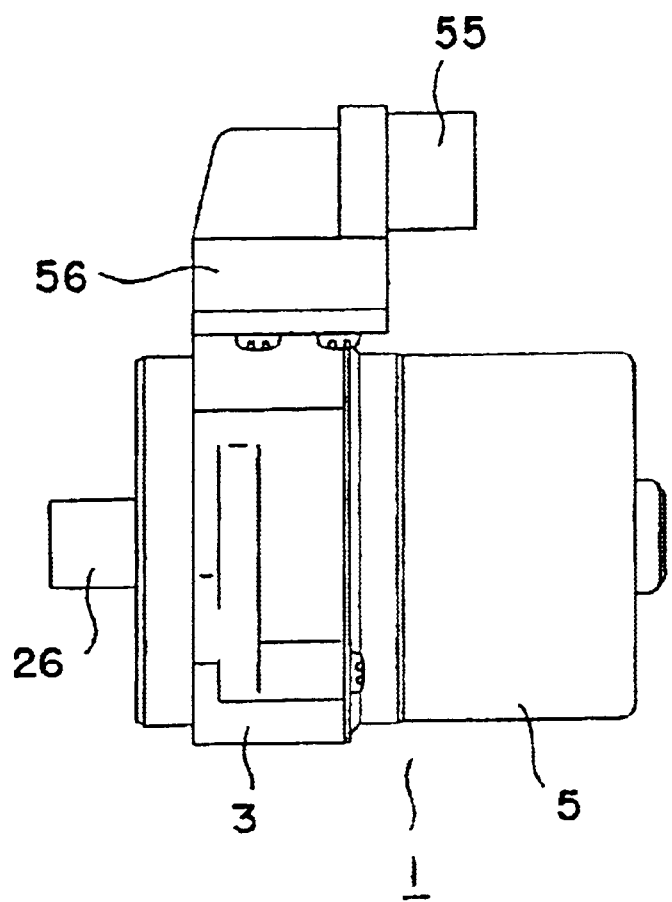
FIG. 17 is a front elevation of a motor in an electric power steering apparatus according to a further embodiment of the present invention.
Figure 18:
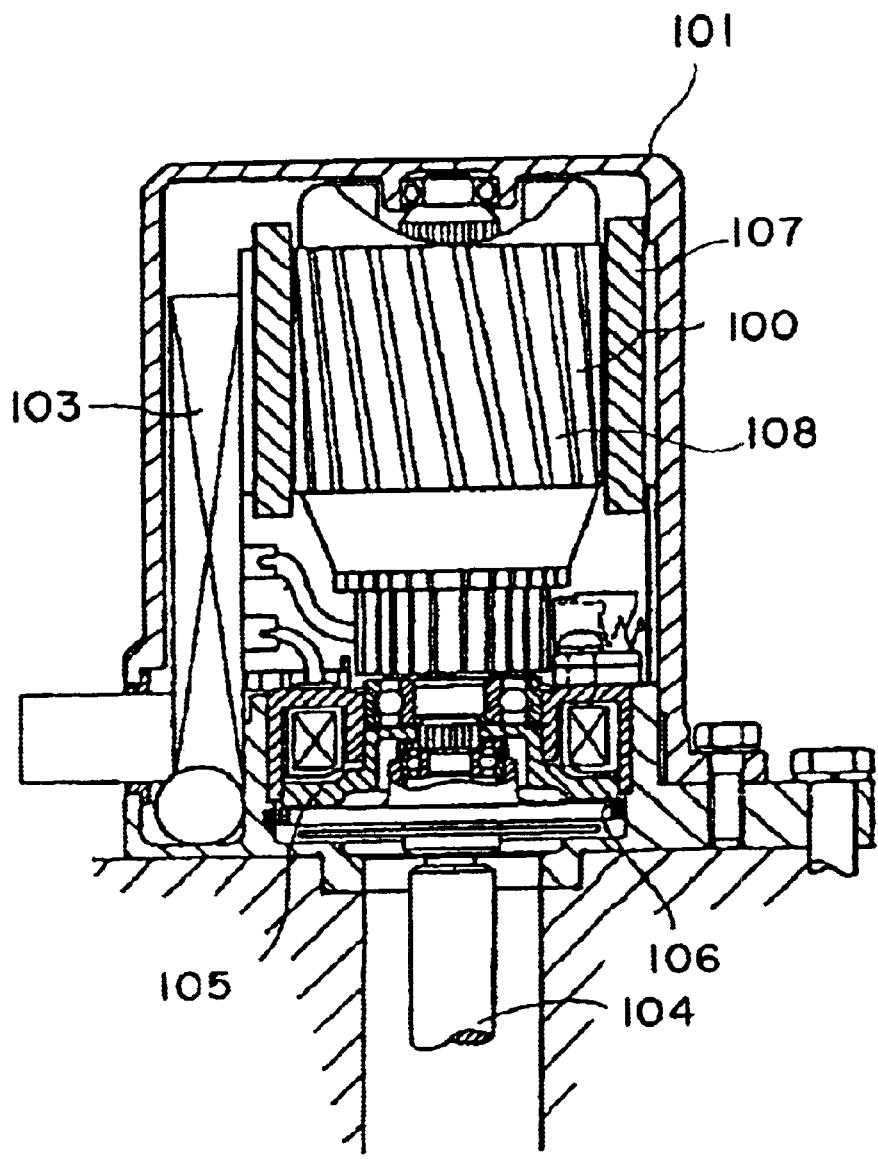
FIG. 18 is a cross sectional front elevational view of a conventional electric power steering apparatus.

Moreover, as shown in FIG. 17, the attachment 56, the U phase, V phase and W phase connector 55, and the sensor connector may be integrated with one another while eliminating the lead wires 52 and the sensor lead wires 53 of FIG. 16. With such a construction, it is possible to electrically connect the motor 1 with the control circuit unit without changing the above-mentioned structure of the motor 1.

In addition, although in the above embodiments, it has been constructed such that both the bus bars 20 and the sensor terminals 47 pass through the casing opening in the form of the heat sink opening 46 and the housing opening 38, individual openings, through which the bus bars and the sensor terminals can pass respectively, may be provided separately from each other.

Further, the motor may be constructed such that a rotor core having a motor coil mounted thereon for generating a rotating magnetic field is fixed to the shaft with a stator being arranged around the outer periphery of the rotor core.

As explained above, an electric power steering apparatus according to one aspect of the present invention includes: a motor having a housing and a shaft disposed on an axis of the housing and connected with a steering mechanism of a vehicle, the motor being operable to assist a steering force of a steering wheel through the shaft; and a control circuit unit with a power device for driving the motor being disposed in a casing, wherein the housing is formed with a housing opening through which lead wires pass, and the casing is also formed with a casing opening through which the lead wires pass, and the motor and the control circuit unit are integrated with each other with the housing opening and the casing opening disposed to correspond to each other. With the above arrangement, when either one of the motor and the control circuit unit fails, it is only necessary to replace the failed one alone, thus making it possible to reduce the cost of replacement. In addition, it only has to first assemble the motor and the control circuit unit separately from each other and then integrate the motor and the control circuit unit into a single unit in the final process, thus improving the assemblability thereof.

In a preferred form of the present invention, the lead wires are composed of bus bars which are exposed from the casing opening and electrically connected with the power device. The bus bars are connected through relay wires with a motor coil which is disposed in the housing for generating a rotating magnetic field. Thus, it becomes possible to improve the connection workability of the lead wires which electrically connect the motor and the control circuit unit.

In another preferred form of the present invention, the lead wires are composed of sensor terminals which are exposed from the casing opening and electrically connected through sensor lead wires with a rotational position sensor disposed in the housing for detecting a rotational angle of the shaft. Thus, it becomes possible to improve the connection workability of the lead wires which electrically connect the control circuit unit and the rotational position sensor.

In a further preferred form of the present invention, the lead wires are composed of bus bars which are exposed from the casing opening and electrically connected with the power device. The bus bars are connected through relay wires with a motor coil disposed in the housing for generating a rotating magnetic field. Thus, it becomes possible to improve the connection workability of the lead wires which electrically connect the motor and the control circuit unit. In addition, it becomes possible to improve the connection workability of the lead wires which electrically connect the control circuit unit and the rotational position sensor.

In a still further preferred form of the present invention, the bus bars have one ends thereof connected with one ends of the corresponding relay wires by means of screws. Thus, it is easy to electrically connect the motor and the control circuit unit with each other and to disconnect or separate them from each other.

In a yet further preferred form of the present invention, the sensor terminals and the rotational position sensor are connected with each other through sensor connectors which are provided at opposite ends of the sensor lead wires, respectively. Thus, it is easy to electrically connect the sensor terminals and the rotational position sensor.

In a further preferred form of the present invention, the bus bars extend in a direction perpendicular to the axis of the shaft. Thus, the bus bars can be easily inserted into the housing opening, thereby making it easy to integrate the motor and the control circuit unit with each other.

In a further preferred form of the present invention, the sensor terminals extend in a direction perpendicular to the axis of the shaft. Thus, the sensor terminals can be easily inserted into the housing opening, thereby making it easy to integrate the motor and the control circuit unit with each other.

In a further preferred form of the present invention, the sensor connector on the sensor terminal side is engaged with the housing opening through an engagement member. Thus, the sensor connector can be engaged with the housing opening in a reliable manner.

In a further preferred form of the present invention, the engagement member is elastically engaged with an inner wall of the housing opening. Thus, the engagement member can be engaged with the housing opening with a simple structure.

In a further preferred form of the present invention, the housing has holes formed at locations in opposition to the screws, the one ends of the bus bars and the one ends of the relay wires being connected with each other by the screws through the holes. With this arrangement, it is easy to carry out the threaded connection and disconnection (or release) between the ends of the bus bars and the ends of the relay wires.

In a further preferred form of the present invention, the housing is formed with an engagement portion which is adapted to be placed in fitting engagement with a gearbox of the steering mechanism, and the holes are formed on an inner side of the engagement portion. Thus, it is unnecessary to use sealing members for sealing the holes to insure waterproofness in the interior of the housing.

In a further preferred form of the present invention, bus bar side terminals of the relay wires, which are attached to the bus bars by the screws, and nuts, into which the screws are threaded, are insert molded to form a base. With this arrangement, it is possible to easily carry out the threaded connection and disconnection (or release) of the bus bars and the bus bar side terminals.

In a further preferred form of the present invention, the base is formed with an engaging portion which is adapted to be engaged with an engaged portion formed on the housing for preventing turning of the base when the bus bars and the bus bar side terminals are fixed to each other by means of the screws. With this arrangement, it is possible to prevent damage to the bus bars and the bus bar side terminals due to rotational forces applied thereto by fastening of the screws at the time of screw fastening operation.

In a further preferred form of the present invention, a sealing member is provided around the housing opening for sealing a peripheral portion of the housing opening. Thus, the waterproofness of the housing is insured.

In a further preferred form of the present invention, fixing locations, at which the motor and the control circuit unit are fixed to each other, are disposed on a steering mechanism side at which the housing opening exists, and on a side opposite the steering mechanism at which the casing opening exists. With this arrangement, the motor and the control circuit unit are strongly joined to each other, thereby improving their vibration resistance and shock resistance.

In a further preferred form of the present invention, a stay of an L-shaped cross sectional shape is used for fixing the motor and the control circuit unit to each other at the side opposite the steering mechanism, the stay having a first leg portion fixedly secured to the control circuit unit and a second leg portion fixedly secured to the motor. With this arrangement, the motor and the control circuit unit are integrated with each other with a simple structure.

In a further preferred form of the present invention, a substrate, on which the power device is mounted, is in surface contact with a heat sink which forms one surface of the casing. Thus, heat from the power device, which is a heat source, is discharged through the heat sink.

In a further preferred form of the present invention, the heat sink fixedly mounted on the motor is formed with a notch conforming to an outer peripheral configuration of the motor. With this arrangement, the entire height of the apparatus can be reduced, thereby improving installability thereof to a vehicle. In addition, it is possible to easily form threaded holes for mounting of the motor in the heat sink as well as to strongly and fixedly join the control circuit unit and the motor with each other.

In a further preferred form of the present invention, a resin mold part is provided in the casing opening for closing the casing opening. Thus, the interior of the control circuit casing is sealed up so that when the control circuit unit alone is stored or transported separately from the motor, dust, dirt or the like can be prevented from entering the control circuit casing.

In a further preferred form of the present invention, the bus bars extends in a direction perpendicular to the substrate and are swingable in an axial direction of the shaft. Thus, when the motor and the control circuit unit are integrated with each other, dimensional errors in the axial direction of these elements can be accommodated, thereby improving the assemblability thereof.

While the invention has been described in terms of preferred embodiments, those skilled in the art will recognize that the invention can be practiced with modifications within the spirit and scope of the appended claims.

What is claimed is:

1. An electric power steering apparatus comprising:
   a motor comprising a housing and a shaft disposed on an axis of said housing and connected with a steering mechanism of a vehicle, said motor being operable to assist a steering force of a steering wheel through said shaft; and
   a control circuit unit comprising a power device for driving said motor being disposed in a casing;
   wherein said housing includes a housing opening through which lead wires pass,
   said casing includes a casing opening through which said lead wires pass,
   said motor and said control circuit unit are integrated with each other with said housing opening and said casing opening disposed to correspond to each other,
   said lead wires comprise bus bars which are exposed from said casing opening and electrically connected with said power device, said bus bars being connected through relay wires with a motor coil which is disposed in said housing for generating a rotating magnetic field, and
   said lead wires further comprise sensor terminals which are exposed from said casing opening and electrically connected through sensor lead wires with a rotational position sensor disposed in said housing for detecting a rotational angle of said shaft.

2. The electric power steering apparatus according to claim 1, wherein said bus bars have end portions connected with end portions of said corresponding relay wires by means of screws.

3. The electric power steering apparatus according to claim 2, wherein said housing includes holes formed at locations in opposition to said screws, the one ends of said bus bars and the one ends of said relay wires being connected with each other by said screws through said holes.

4. The electric power steering apparatus according to claim 3, wherein said housing includes an engagement portion which is adapted to be placed in fitting engagement with a gearbox of said steering mechanism, and said holes are formed on an inner side of said engagement portion.

5. The electric power steering apparatus according to claim 2, wherein bus bar side terminals of said relay wires, which are attached to said bus bars by said screws, and nuts, into which said screws are threaded, are insert molded to form a base.

6. The electric power steering apparatus according to claim 5, wherein said base is formed with an engaging portion which is adapted to be engaged with an engaged portion formed on said housing for preventing turning of said base when said bus bars and said bus bar side terminals are fixed to each other by means of said screws.

7. The electric power steering apparatus according to claim 1, wherein said bus bars extend in a direction perpendicular to the axis of said shaft.

8. The electric power steering apparatus according to claim 1, wherein a substrate, on which said power device is mounted, is in surface contact with a heat sink which forms one surface of said casing.

9. The electric power steering apparatus according to claim 8, wherein said heat sink fixedly mounted on said motor includes a notch conforming to an outer peripheral configuration of said motor.

10. The electric power steering apparatus according to claim 8, wherein said bus bars extends in a direction perpendicular to said substrate and are swingable in an axial direction of said shaft.

11. The electric power steering apparatus according to claim 1, wherein said sensor terminals and said rotational position sensor are connected with each other through sensor connectors which are provided at opposite ends of said sensor lead wires, respectively.

12. The electric power steering apparatus according to claim 1, wherein said sensor terminals extend in a direction perpendicular to the axis of said shaft.

13. The electric power steering apparatus according to claim 1, wherein said sensor connector on the sensor terminal side is engaged with said housing opening through an engagement member.

14. The electric power steering apparatus according to claim 13, wherein said engagement member is elastically engaged with an inner wall of said housing opening.

15. The electric power steering apparatus according to claim 1, wherein a sealing member is provided around said housing opening for sealing a peripheral portion of said housing opening.

16. The electric power steering apparatus according to claim 1, wherein fixing locations, at which said motor and said control circuit unit are fixed to each other, are disposed on a steering mechanism side at which said housing opening exists, and on a side opposite said steering mechanism at which said casing opening exists.

17. The electric power steering apparatus according to claim 1, wherein a resin mold part is provided in said casing opening for closing said casing opening.

* * * * *